United States Patent [19]
O'Brien et al.

[11] Patent Number: 5,278,973
[45] Date of Patent: Jan. 11, 1994

[54] DUAL OPERATING SYSTEM COMPUTER

[75] Inventors: Steven M. O'Brien; Michael J. Saunders; Arthur J. Nilson, all of Norristown, Pa.

[73] Assignee: Unisys Corporation, Blue Bell, Pa.

[21] Appl. No.: 722,722

[22] Filed: Jun. 27, 1991

Related U.S. Application Data

[63] Continuation-in-part of Ser. No. 329,136, Mar. 27, 1989, abandoned.

[51] Int. Cl.⁵ .............................................. G06F 9/22
[52] U.S. Cl. ...................... 395/500; 395/700; 395/375; 364/DIG. 2; 364/976.3; 364/280
[58] Field of Search ............... 364/DIG. 1, DIG. 2

[56] References Cited

U.S. PATENT DOCUMENTS

| | | | |
|---|---|---|---|
| 4,099,234 | 7/1978 | Woods et al. | 395/275 |
| 4,179,735 | 12/1979 | Lodi | 395/700 |
| 4,530,052 | 7/1985 | King et al. | 364/200 |
| 4,691,278 | 9/1987 | Iwata | 395/375 |
| 4,814,975 | 3/1989 | Hirosawa et al. | 395/375 |

*Primary Examiner*—Gareth D. Shaw
*Assistant Examiner*—Lucien Toplu
*Attorney, Agent, or Firm*—John B. Sowell; Mark T. Starr; Thomas J. Scott

[57] ABSTRACT

A mainframe computing system is adapted to be loaded with one of a plurality of different operating systems and different associated microcode to provide a computing system which is capable of running user programs adapted to be executed by the loaded operated system comprises a main memory for receiving the desired operating system coupled to a system bus. An instruction processor and an input/output control processor are coupled to the system bus and are provided with an instruction register for presenting user program instructions to the processors. The processor means have associated therewith microcode storage memory which receive and store a set of microcode instructions to be performed by the processors according to the program instruction stored in the instruction register. The stored microcode comprises primary microcode instructions to carry out each of the instructions in the instruction register means. No compiling or emulation is necessary to provide a software configurable computing system adapted to run user programs according to one of a plurality of operating systems loadable in the main memory.

10 Claims, 4 Drawing Sheets

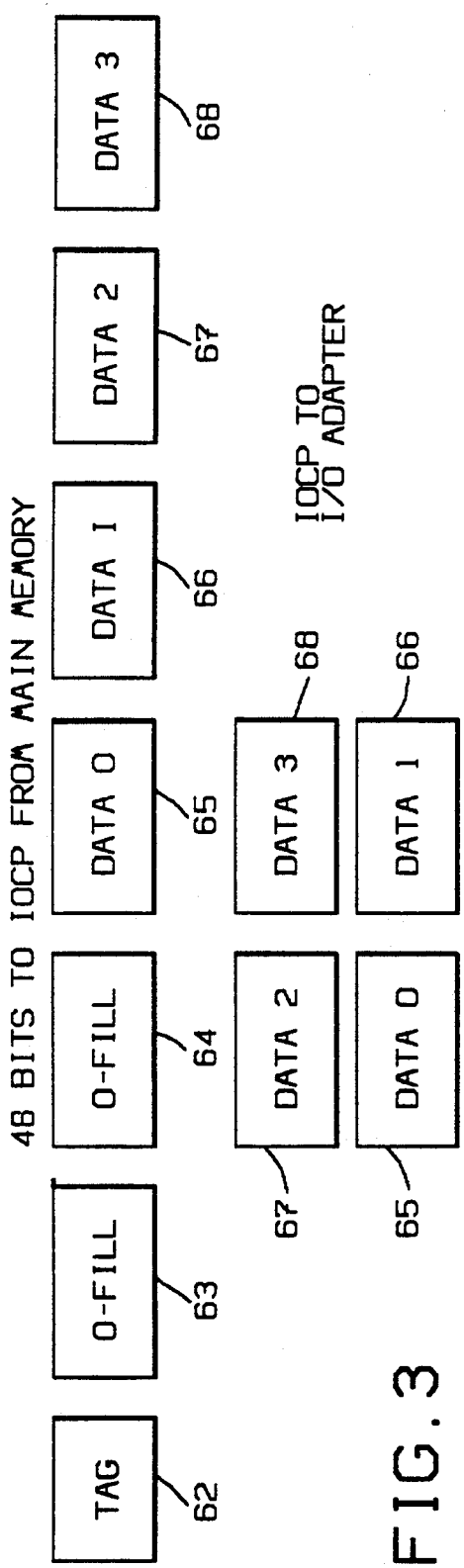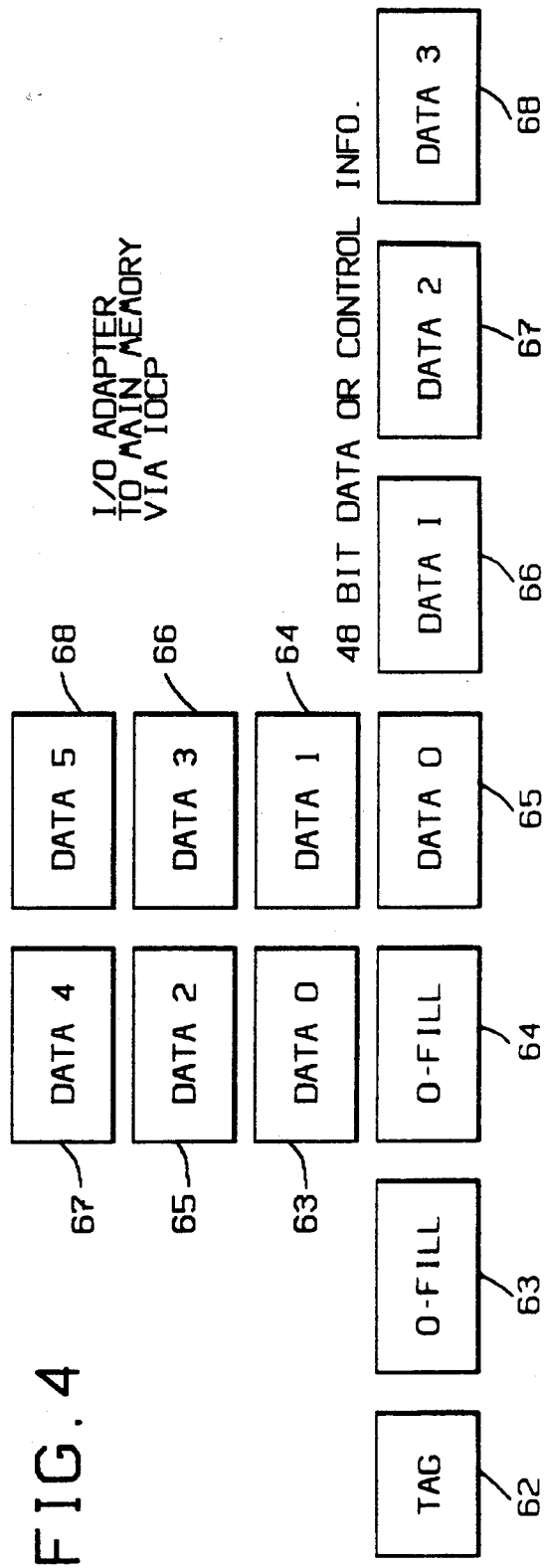
FIG. 3
FIG. 4

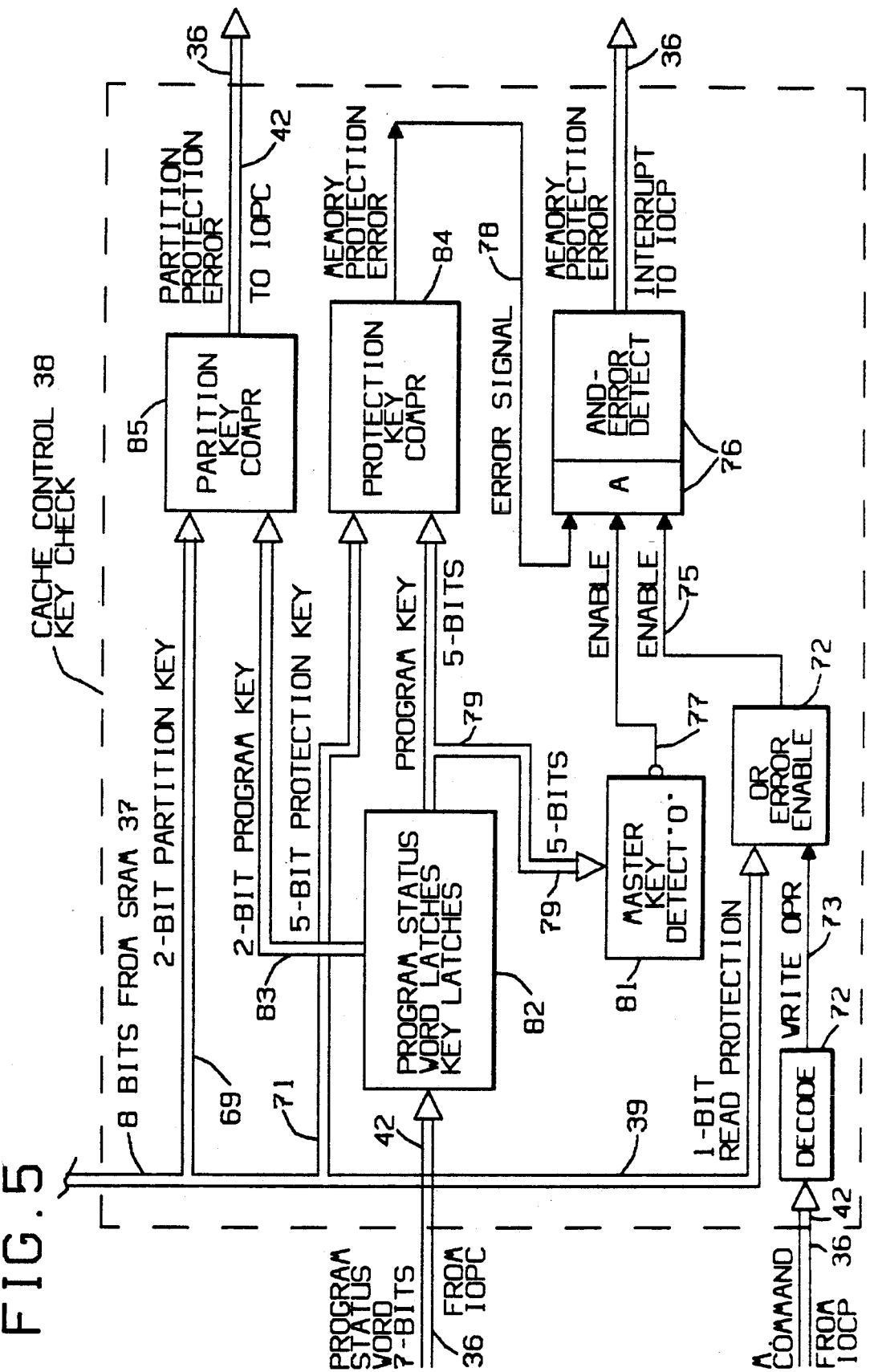

DUAL OPERATING SYSTEM COMPUTER

This application is a continuation-in-part of application Ser. No. 07/329,136 filed Mar. 27, 1989, now abandoned.

BACKGROUND OF THE INVENTION

1. Field of the Invention

The present invention relates a mainframe computer system that is operable on one of two distinctly different operating systems. More particularly, the present invention relates to a dual purpose computer that may be loaded with one of two distinctly different operating systems and associated microcode to prepare the same computer for operation with application programs that are designed for the operating system that is loaded into the computing system.

2. Description of the Prior Art

Compilers and emulators are well known and are generally used as black box systems for converting operating instructions from one format into another format which is usable by a different computing system. Compilers and emulators have been classified in U.S. Class 364, Subclass 200 with dual mode operating system computers and microprogrammed computers which have alterable stored micro routines utilized to emulate different computers or computing systems. Such computing systems are discussed in the microprogrammable CPU described in U.S. Pat. No. 4,199,811 which has been assigned to the same assignee as the present invention. This prior art reference discusses the reasons that cause microprogrammed emulators to be generally slower than an emulated computing system which offers a desirable yet complex solution.

U.S. Pat. No. 4,791,558 describes a system for generating computing programs. This reference generally describes a compiler or emulator for adapting IBM System 370 program object modules arranged in general format to a format usable by IBM RT PC AIX operating systems of the type used on a personal computer. While this type of compiler does adapt a large library of existing programs to new architecture computers, the compiler (or modified compiler) which produces an object module having instructions for the new computing system converts the first instruction format which is not loadable into the new computing system into a second format which is loadable into the new computing system.

A more desirable, and more expensive, approach to emulation is found in the IBM AS 400 computing system which operates on two distinct operating systems. Such Dual Operating System Computers require a new architecture different from either previous architectures or systems being merged together and operate on a single new operating system. A variation of such merged operating system is described in U.S. Pat. No. 4,747,040 issued to AT&T. This dual mode operating system computer supports UNIX® and MS-DOS® operating systems in a multi-tasking computing systems. The MS-DOS operating system and its applications are executed in a real or non-protected mode and UNIX applications are executed by the UNIX operating system in a protected mode to prevent conflicting attempts to access the same peripheral device or to write in the same region of the main memory. To prevent such conflicts, special merge support hardware needs to be provided.

It would be desirable to provide a mainframe computing system which is designed for operation with a first preferred mode operating system that will efficiently execute programs designed for operation on the mainframe computing system when loaded with the first operating system. It would be further desirable to provide the same mainframe computing system with structural means which permit the computing system to be loaded with second and distinctly different operating system so that the same structural mainframe is also operable efficiently on a second and different operating system and efficiently executes these programs designed for operation by the second operating system.

SUMMARY OF THE INVENTION

It is a primary object of the present invention to provide a dual operating system computer which efficiently runs programs which are designed to be run on separate and distinct operating systems.

It is another primary object of the present invention to provide an alterable computing system which is able to perform instructions of different operating systems which are carried out as a plurality of operations defined by machine microcode instructions.

It is another primary object of the present invention to provide a computing system designed to perform instructions according to a predetermined series of microcode instructions that may be programmed with the first operating system and a different series of the same microcode instructions to perform different instructions associated with the different operating systems.

It is a general object of the present invention to provide a universal computing system that is software programmable with different operating systems and microcode to perform programs designed for distinctly different operating systems.

It is a general object of the present invention to provide one universal mainframe computing system which is programmably alterable to operate as distinctly different computer systems.

It is another general object of the present invention to provide a modified basic mainframe computer which is capable of operating either as a basic mainframe computer or as another mainframe computer without the expense of providing a duplex or dual operating system computer with new architecture.

It is yet another object of the present invention to provide a novel basic mainframe computing system having a programmable bi-directional emulator coupled between the I/O adapter and the main memory to enable the operation of the basic mainframe computing system with one of a plurality of different operating systems.

It is yet another object of the present invention to provide a computing system a method and means for permitting a large number of programs to rise in memory and to check that no one program in memory attempts to utilize a portion of the main memory reserved for a different program.

According to these and other objects of the present invention, there is provided a mainframe computing system with a main memory which may be loaded with one of a plurality of distinctly different operating systems that characterize distinctly differently mainframe computers. The instruction processor (IP) and the input/output control processor (IOCP) are provided with an associated control storage memory containing microcode. Instructions to be performed by the computing system are examined by the IP and IOCP and then converted into a plurality of microcode instructions which perform each instruction as a basic mainframe computer instruction according to the basic computer operating system. The sequence of microcode instructions emulate instructions which would be performed by different computing operating systems. Each microcode instruction is performed in one machine cycle of the basic mainframe computing system, thus, the basic computer and the modified different computers will perform similar instructions with equal speed and efficiency.

BRIEF DESCRIPTION OF THE DRAWINGS

FIG. 3 is a pictorial representation of the orientation of the bytes of data being transferred from main memory to the I/O adapter via the IOCP;

FIG. 4 is a pictorial representation of the orientation of the bytes of data being transferred from I/O adapter to the main memory via the IOCP; and FIG. 5 is a more detailed blocked diagram of the key check logic of the cache control shown in FIG. 1.

DESCRIPTION OF THE PREFERRED EMBODIMENT

Figure 1:
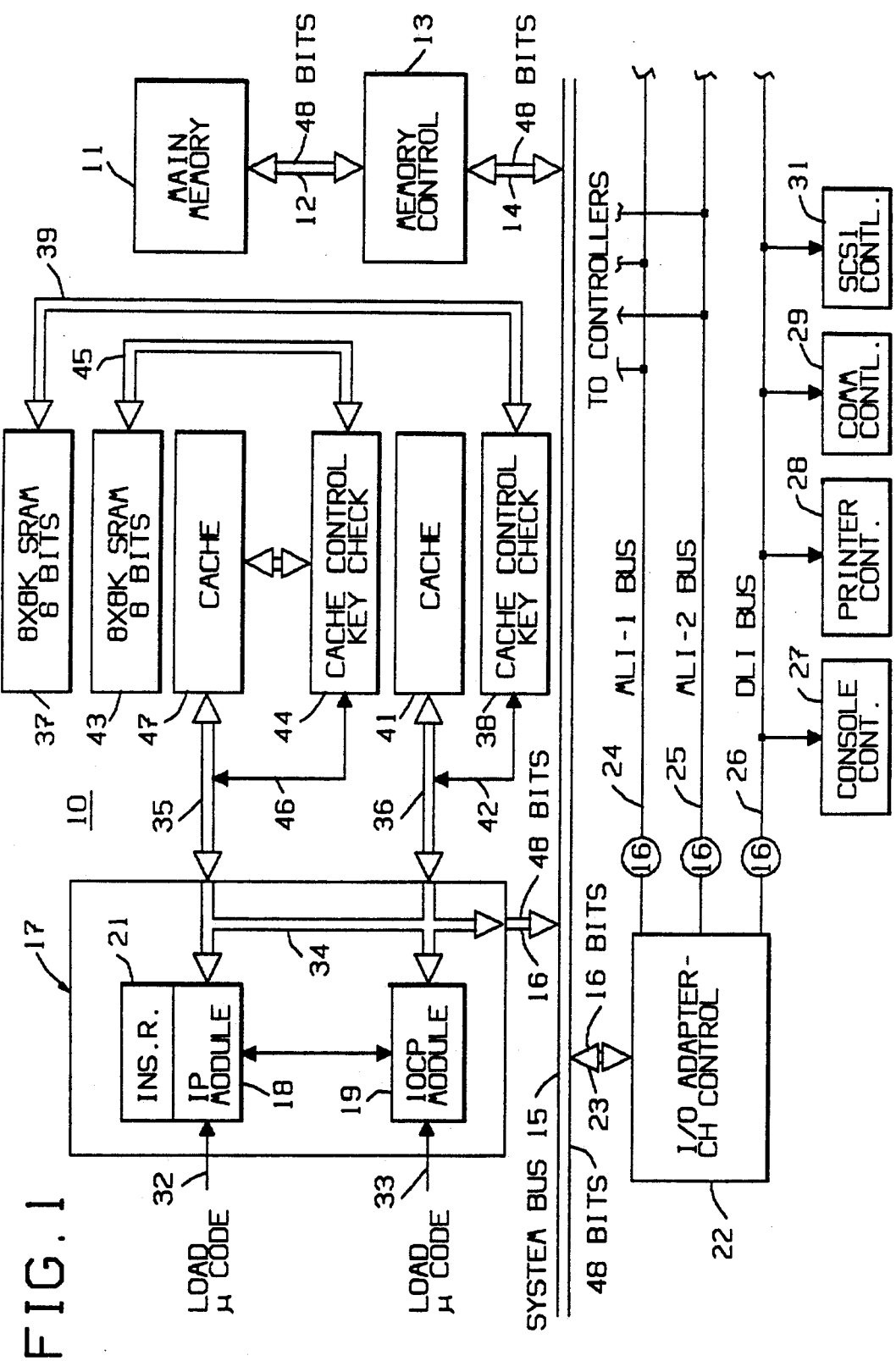
FIG. 1 is a block diagram of the present invention dual operating system computer.

Refer now to FIG. 1 showing a block diagram of the preferred embodiment of the present invention dual operating system computer 10. The main memory 11 is shown coupled by bus 12 to a memory control or controller 13 and by a bus 14 to the system bus 15. Basically, the buses 14 and 15 are part of the same bus. Similarly, bus 16 is part of the system bus 15 which connects to the processor module 17 which is shown comprising an instruction processor (IP) module 18 and a input/output control processor (IOCP) module 19. Instructions and data in the main memory 11 are routed via the system bus 15 to the processor module 17. The instructions are routed to the instruction register 21 and data is routed to buffers associated with the IOCP 19. Instructions or control information are maintained in a 48 bit format in the instruction register 21 where they are carried out in microcode instruction routines which will be explained in more detail hereinafter. Data buffered in the IOCP 19 is reformatted for transmission to and from the I/O adapter 22 via bus 23 which is capable of transmitting 2 bytes or 16 bits in parallel whereas the system bus and buses 12, 14 and 16 are 48 bits wide in parallel. I/O adapter 22 is shown having two message level interface (MLI) buses 24 and 25 each of which may have connected thereto a many as 8 controllers. Device level interface (DLI) bus 26 is shown having the only console control 27 connected thereto as well as a printer controller 28, a communications controller 29 and a small computer systems interface controller 31. DLI bus 26 accommodates up to 7 controllers.

In the preferred embodiment of the present invention the main memory 11, memory controller 13 and the complete system bus 15, I/O adapter 22 and all peripheral equipment connected thereto is identical to the equipment presently commercially sold as Unisys A Series computing systems, models A1 through A6 an do not require detailed explanation of their operation for purposes of the present invention. The processors 18, 19 of modules 17 for the Unisys A Series model computers has been modified to accommodate the present invention and to operate in the previous manner employing MCP operating systems without hardware modification. Thus it will be understood that the previous used MCP operating system is loaded into main memory 11, however, new microcode is loaded by line 32 and line 33 into the IP module and the IOCP modules respectively to prepare the FIG. 1 computer system for operation as a Unisys A Series computing system.

According to the present invention, instead of loading the MCP operating system into main memory 11, a completely different operating system may be loaded into main memory 11 and a different microcode program is loaded into the IP and IOCP modules 18 and 19 so that the FIG. 1 computer system operates as an entirely different computing system. An OS/3 operating system may be loaded in main memory and a different microcode program loaded in the IP and IOCP modules 18 and 19 so that the FIG. 1 computing system operates identically as a System 80 model 7E computing system using programs commonly identified as System 80 programs. Since the previous System 80 type computer employed a check program which was not compatible with the Unisys A Series check program a modified check program card is shown connected to the processor module 17 via interconnect bus 34 and cache buses 35 and 36.

The operating system stored in main memory 11 blocks out a portion of main memory as working memory for a user program as is commonly known in computing systems. The block or range of addresses are identified by an 8 bit byte in the 8 by 8K static RAM 37 which is loaded by microcode via the cache control and key check logic 38 and bus 39. Cache memory 41 is employed as a working memory and contains small portions of the user program or data in main memory 11 associated with the user program. The microcode for controlling the cache control 38 is loaded in the IOCP module 19 and controls via bus 36 and control bus 42.

In similar manner, blocks of main memory 11 are identified by addresses in static RAM 43 and loaded by the cache control 44 under control of microcode stored in instruction processor module 18 and via bus 35 and control bus 46. Cache memory 47 also contains portions of user program and data stored in main memory 11 similar to cache memory 41. Providing dedicated cache memories 41 and 47 associated individually with IOCP 19 and IP 18, enhances the speed of operation and simplifies the logic structure.

In the preferred embodiment of the present invention, the Unisys A Series computer instructions stored in main memory 11 are loaded into instruction register 21 for execution. The 80 bit instruction is broken down into 17 micro-code fields which permit an infinite number of different operations to perform a result function. The A Series operating system is provided with 256 operating instructions whereas the System 80 machine is provided with 170 operating instructions. By using a compiler to convert the instructions of the different operating systems into a result function using an infinite number of different micro instruction routines, it is possible to precompile the microcode to be loaded in the instruction processor 18 and IOCP 19 so that the instructions of the operating system of the System 80 are executed in approximately the same number of machine cycles as the original dominant A series machine which is converted by the precompiled microcode associated with the different operating systems. It will be understood that the present invention is illustrated and described employing two known operating systems and one existing and known computing system and that the same principal of operation may be applied to other operating systems so that the computing system shown in FIG. 1 may be loaded with different operating systems and different associated microcode to perform as separate and distinct computing systems. By precompiling the microcode associated with the operating system and loading this precompiled microcode into the processor module 17 the speed of operation of the computing system is not degraded as occurs in the prior art compilers and emulators discussed hereinbefore.

Figure 2:
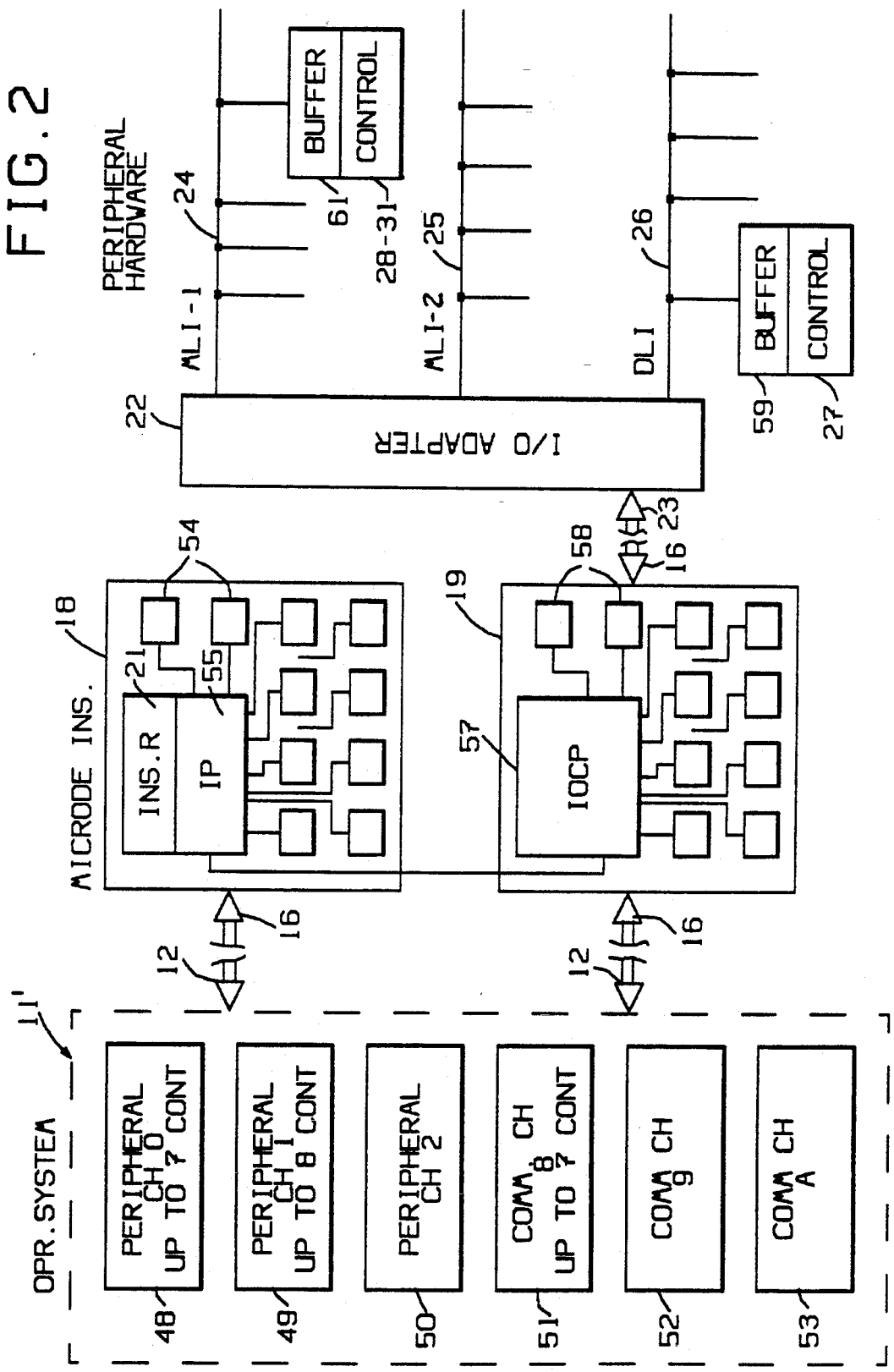
FIG. 2 is a block diagram of the input/output configuration as functionally seen by the operating system software.

Refer now to FIG. 2 showing a block diagram of the input/output configuration as functionally seen by the operating system software. The operating system software in main memory 11 is partitioned to individually control the six channels shown as peripheral channels 0, 1 and 2, and communication channels 8, 9 and A. The software is capable of having operations in progress at all channels at the same time. It will be understood that the six channels 48 to 53 shown as software control channels do not exist as hardware channel controllers anywhere in the system. Control of the channels is accomplished by the software in conjunction with hardware in the instruction processor module 18 and the IOCP module 19 as well as bus control logic located in the I/O adapter 22. As shown in phantom block 11' and blocks 48, 51 for peripheral channel 0 and channel 8 may have up to 7 controllers such as controllers 27 to 31. Channels 1 and 9 and 2 and A may have up to eight controllers. In the preferred embodiment shown, channel 0 and channel 8 both share the device level interface at bus 26, thus only a total of 7 controllers may be shared between these two channels. Similarly, channel 1 and channel 9 share message level interface bus 24. Channel 2 and channel A share message level interface bus 25 so that their total number of controllers shared between them is limited to 8 controllers.

As previously explained, all instructions in main memory 11 are first loaded into the instruction register 21 where they are interpreted and executed under control of the aforementioned microcode which is loaded into the 10 static RAM chips 54 which are directly connected to the instruction processor chip 55. When the instruction loaded into instruction register 21 is an I/O instruction, the information is transferred via control bus 56 to the IOCP chip 57 where the instruction is executed under control of microcode loaded into the 10 static RAM chips 58. The I/O instructions are loaded into the I/O adapter 22 iva bus 16, 23 for execution by the I/O adapter and its associated controllers. Buffer registers in the I/O adapter 22 provide the necessary status information of the individual controllers shown as controllers 27 to 31 and their associated buffers 59 and 61. In similar manner, data being transferred from peripheral devices to the main memory 11 is buffered in buffers 59, 61, etc. and passed through the I/O adapter 22 and is routed through the IOCP and returns across the system bus to main memory 11.

Refer now to FIG. 3 showing a pictorial representation of the orientation of the bytes of data being transferred from main memory 11 to the I/O adapter 22 via IOCP module 19. The data word is shown comprising 6 bytes of 8 bits each and where necessary or appropriate, a further byte of tag information comprising 4 bits is provided. The tag byte 62, is in the most significant bit positions. Byte 63 and 64 which comprise the two most significant word byte positions are shown having zero fill because the 48 bits being transferred from main memory are for a computing system which requires only 32 bits which may be provided by the four least significant byte positions 65 to 68. Since the information on the memory bus 12 and system bus 15 is 48 bits wide (plus any tag requirements) the information must be reformatted in order to be loaded into the I/O adapter 22. For this purpose the 48 bit wide word is first stored in the buffers of the IOCP module 19 and read out onto bus 16 two bytes at a time in parallel as diagrammatically shown. Thus data 0 and 1 bytes 65 and 66 are first transferred on buses 16, 15 and 23 into the I/O adapter 22 followed by bytes 67 and 68. When the most significant bytes 63 and 64 are zero filled, they would have been transferred into the I/O adapter preceding bytes 65 and 66, however, having been zero filled they are ignored and not transferred into the I/O adapter 22.

Refer now to FIG. 4 showing a pictorial representation of the orientation of the bytes of data being transferred from the I/O adapter 22 to the main memory 11 via IOCP module 19. For purposes of this illustration, the 6 byes 63 to 68 are shown comprising 3 sets of two bytes of 16 bits which would be provided at the output of the I/O adapter 22 on bus 23. Assume that the data word in the peripheral device is only 32 bits when the byte 63 and 64 did not exist and were not transferred from the I/O adapter on bus 23 to the IOCP module 19. Thus, when the IOCP generates the tag byte 62, it also generates the SET O-FILL bytes 63 and 64 in the most significant positions and then reads the bytes 65 to 68 onto bus 16, bus 15 as a 48 bit byte with tag which is stored in the main memory 11.

Refer now to FIG. 5 showing a more detailed block diagram of the key check logic associated with the identical cache controls 38 or 44 and will be explained with reference to cache control 38. The key stored in static RAM 37, which identifies the protected block appears as 8 bits on bus 39. The most significant two bits identify the partition key on bus 69 and the next 5 most significant bits on bus 71 identify the protection key. The least significant 1 bit on bus 39 identifies the read protection enable status and is applied to the error enable logic 72 along with a write operation signal on line 73 which is generated in decoder 74 from a memory command field signal from the IOCP on buses 36 and 42. Thus, if a read protect lag is raised on line 39 or a write operation is being performed to generate a signal on line 73, logic 72 produces an enable signal on line 75 to the AND-error detect logic 76. If signals on line 77 and 78 are also present as high signals, an interrupt signal is produced at the output of logic 76 on bus 42 to interrupt the IOCP comprising a memory protection error signal. If any one of the 5 bits on bus 79 is a 1 bit the master key detect logic 81 will produce a high signal on line 77 which enables the AND-error detect logic 76. A duplicate of the key stored in static RAM 37 is stored in the IOCP as a program status word comprising 7 bits. The status word is presented on bus 42 to the program status word latches 82 where it latches to produce the aforementioned 5 bit program key signal on the bus 79 and to produce a 2 bit program key signal one line 83. The 5 bit protection key on bus 71 is compared with the program key signal on bus 79 in protection key compare logic 84 to produce a memory protection error signal on line 78 if a comparison is not made. It will be understood that the error signal on line 74 will always be converted into an interrupt signal when the error conditions on enable line 75 are present, because the master key detect logic 81 merely defines a condition in which all areas of memory are accessible. The two bit partition key on bus 69 and the two bit program key on bus 83 are applied to the partition key compare logic 85 to produce a partition protect error signal on bus 42 which is applied to bus 36 and the IOCP module 19. A comparison indicates no error and a difference or miscompare indicates that memory has been addressed outside of the block of memory assigned the IP or IOCP. It will be understood that the partition key logic 85 applies to the IP and IOCP whereas the protection key logic 84 applies to user programs and the area of memory allocated or assigned for the program being performed by the IOCP and the IP. The partition key logic 85 would not be required unless there are multiple IPs and their associated IOCPs.

Having explained a preferred embodiment of the present invention employing specific known computing systems, it will be understood that other existing computing systems may be modified in the same manner so that such modified computing systems may be operated with different operating systems and different precompiled microcode to emulate an entirely different computing system. It is not necessary to generate a new architecture computing system for merging two previous computer operating systems in order to run programs designed for the different operating systems. Further, the present invention is not limited to dual operating system computers but may be expanded to more than two operating systems by compiling or pre-compiling additional microcode to be loaded into the processor module along with the new or different operating system loaded in the main memory 11.

A feature of the present invention is that the program instruction loaded in the instruction register 21 of the instruction processor module 18 is performed by a plurality of primary microcode instructions, each of which is operated in one short machine cycle so that a series of such primary microcode instructions performs the program instructions stored in the instruction register 21, thus, there is no waiting time for compilers or emulators to decide which primary microcode instructions are to be employed because they are already loaded in the processor module 18.

What is claimed is:

1. A mainframe computing system of the type designed to run on one a plurality of distinctly different operating systems, comprising:
   a system bus,
   main memory means coupled to said system bus for receiving on boot up one of a plurality of distinctly different operating systems and user programs operable by one of the operating systems being loaded via said system bus,
   input/output adapter means coupled to said system bus and to a plurality of interface peripheral controllers for controlling I/O channels,
   instruction processor means for receiving said user programs from said main memory coupled to said system bus for executing user program instructions located in said main memory means;
   input/output control processor means coupled to said system bus for executing user program instructions related to said input/output adapter means and for transferring data to and from said main memory to and from said input/output adapter means,
   instruction register means coupled to said instruction processor means and to said input/output control processor means for presenting the user program instructions to both said processor means,
   microcode storage means coupled to said instruction processor means and to said input/output control processor means for presenting primary microcode instructions to be performed by both said processor means to execute said program instruction stored in said instruction register,
   predetermined microcode routines loaded on boot up in said microcode storage means for providing a series of primary microcode routines for the operating system under program instructions stored in said instruction register means, and
   means for loading said predetermined microcode routines in both said processor means to provide a computing system loaded in said main memory.

2. A computing system as set forth in claim 1 wherein said instruction register means is loaded with user program instructions and wherein said instruction register is comprises a plurality of microcode fields.

3. A computing system as set forth in claim 2 wherein said plurality of microcode fields are variable and/or changeable and said user program instruction may be performed by a series of primary microcode instructions greater than the plurality of microcode fields.

4. A computing system as set forth in claim 3 wherein both said processor means comprises high speed LSI logic for performing primary microcode instructions in one machine cycle time.

5. A computing system as set forth in claim 1 wherein both said processor means comprises hybrid modules having large scale integration (LSI) chips coupled to said microcode storage means.

6. A computing system as set forth in claim 5 wherein said microcode storage means comprises a plurality of random access memory chips.

7. A computing system as set forth in claim 1 wherein said processor means further comprises cache control key check means for checking to determine if blocks of memory allocated for a user program use are being exceeded by a user program.

8. A computing system as set forth in claim 7 wherein said cache control key check means further includes memory means for storing protection key words which identify blocks of said main memory allocated for a user program to be protected.

9. A computing system as set forth in claim 8 wherein said cache control key check means further includes program status word storage means for storing program key words which identify the block of said main memory used to execute a user program.

10. A computing system as set forth in claim 9 wherein said cache control key check means further includes comparison means for comparing said protection key words and said program key words to provide memory protection error signals when the block of memory allocated for a user program is being exceeded by a user program.

* * * * *